(12) United States Patent
Ishikawa (10) Patent No.: US 10,916,989 B2
(45) Date of Patent: Feb. 9, 2021

(54) MOTOR, COMPRESSOR, REFRIGERATING AND AIR CONDITIONING APPARATUS, AND METHOD FOR MANUFACTURING MOTOR

(71) Applicant: Mitsubishi Electric Corporation, Tokyo (JP)

(72) Inventor: Atsushi Ishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 5 days.

(21) Appl. No.: 16/313,544

(22) PCT Filed: Aug. 10, 2016

(86) PCT No.: PCT/JP2016/073595
§ 371 (c)(1),
(2) Date: Dec. 27, 2018

(87) PCT Pub. No.: WO2018/029818
PCT Pub. Date: Feb. 15, 2018

(65) Prior Publication Data
US 2019/0319509 A1    Oct. 17, 2019

(51) Int. Cl.
*H02K 5/08* (2006.01)
*H02K 5/02* (2006.01)
(Continued)

(52) U.S. Cl.
CPC ............... *H02K 5/08* (2013.01); *F25B 13/00* (2013.01); *F25B 31/026* (2013.01); *H02K 5/02* (2013.01);
(Continued)

(58) Field of Classification Search
CPC ............ H02K 5/08; H02K 5/02; H02K 15/14; H02K 21/14; H02K 2201/03;
(Continued)

(56) References Cited

U.S. PATENT DOCUMENTS 4,584,750 A * 4/1986 Ozu ...................... F04B 39/127
29/888.025
6,189,322 B1 * 2/2001 Ishihara ................. C09K 5/041
62/114

(Continued)

FOREIGN PATENT DOCUMENTS

CN    102217169 A    10/2011
JP    S60-005258 U    1/1985
(Continued)

OTHER PUBLICATIONS

"Shrink fitting", GH Group, Valencia, Spain, http://www.ghinduction.com/process/shrink-fitting/, printed on Jul. 31, 2020.*
(Continued)

*Primary Examiner* — John K Kim
(74) *Attorney, Agent, or Firm* — Posz Law Group, PLC (57) ABSTRACT

A motor is provided in a shell. The motor includes a stator having an outer peripheral surface facing an inner peripheral surface of the shell, a rotor rotatably disposed inside the stator, and a nonmagnetic film disposed between the outer peripheral surface of the stator and the inner peripheral surface of the shell.

10 Claims, 11 Drawing Sheets

(51) Int. Cl.
*H02K 15/14* (2006.01)
*H02K 21/14* (2006.01)
*F25B 13/00* (2006.01)
*F25B 31/02* (2006.01)

(52) U.S. Cl.
CPC ............ *H02K 15/14* (2013.01); *H02K 21/14* (2013.01); *H02K 2201/03* (2013.01); *H02K 2207/03* (2013.01); *H02K 2213/03* (2013.01)

(58) Field of Classification Search
CPC .. H02K 2207/03; H02K 2213/03; H02K 7/14; H02K 1/185; H02K 1/276; H02K 5/04; F25B 13/00; F25B 31/026; F25B 2400/07; F25B 49/022; F25B 49/02; F25B 2313/0292
USPC .......................................................... 310/89
See application file for complete search history.

(56) References Cited

U.S. PATENT DOCUMENTS

| | | | | |
|---|---|---|---|---|
| 6,858,964 | B2* | 2/2005 | Masumoto | H02K 15/024 310/216.001 |
| 2003/0011272 | A1* | 1/2003 | Kataoka | H02K 15/095 310/199 |
| 2009/0091202 | A1* | 4/2009 | Parmeter | H02K 3/44 310/87 |
| 2010/0034674 | A1* | 2/2010 | Oota | H02K 1/185 417/410.1 |
| 2011/0273033 | A1* | 11/2011 | Nagashima | H02K 15/022 310/44 |
| 2019/0319509 | A1* | 10/2019 | Ishikawa | F25B 49/022 |

FOREIGN PATENT DOCUMENTS

| | | |
|---|---|---|
| JP | H01-113564 U | 7/1989 |
| JP | H02-168830 A | 6/1990 |
| JP | 2002-044892 A | 2/2002 |
| JP | 2004-282928 A | 10/2004 |
| JP | 2008-113492 A | 5/2008 |
| JP | 2010-063344 A | 3/2010 |
| JP | 2010-119157 A | 5/2010 |
| JP | 2013-247837 A | 12/2013 |
| JP | 2015-112011 A | 6/2015 |

OTHER PUBLICATIONS

Office Action dated Sep. 10, 2019 issued in corresponding JP patent application No. 2018-533369 (and English translation).
International Search Report of the International Searching Authority dated Sep. 13, 2016 for the corresponding international application No. PCT/JP2016/073595 (and English translation).
Office Action dated Mar. 30, 2020 issued in corresponding CN patent application No. 201680087557.0 (and English translation).
Office Action dated Aug. 31, 2020 in connection with counterpart Chinese Patent Application No. 201680087557.0 (and English translation).

* cited by examiner

MOTOR, COMPRESSOR, REFRIGERATING AND AIR CONDITIONING APPARATUS, AND METHOD FOR MANUFACTURING MOTOR

CROSS REFERENCE TO RELATED APPLICATION

This application is a U.S. national stage application of International Patent Application No. PCT/JP2016/073595 filed on Aug. 10, 2016, the disclosure of which is incorporated herein by reference.

TECHNICAL FIELD

The present invention relates to a motor, a compressor, a refrigerating and air conditioning apparatus, and a method for manufacturing the motor.

BACKGROUND ART

A motor used in a compressor of a refrigerating and air conditioning apparatus or the like is generally fitted into a shell (casing) of the compressor by shrink fitting or the like. However, since the shell of the compressor is composed of iron, magnetic flux flows from a stator of the motor into the shell, and therefore iron loss occurs and motor efficiency decreases.

For this reason, for example, Patent Document 1 discloses a synchronous generator in which a nonmagnetic frame is provided on an outer peripheral side of a stator, and the stator is fitted into a shell via the nonmagnetic frame. Further, Patent Document 2 discloses a motor in which a stator is mounted into a shell, and an annular air gap is provided between an outer periphery of the stator and an inner periphery of the shell.

PATENT REFERENCE

Patent Document 1: Japanese Patent Application Publication No. H2-168830 (see FIG. 1)

Patent Document 2: Japanese Patent Application Publication No. 2008-113492 (see FIG. 2)

However, when the nonmagnetic frame is provided on the outer peripheral side of the stator, an outer diameter of the shell needs to be large relative to an outer diameter of the stator, and this hinders downsizing of the motor. Further, when the annular air gap is provided between the outer periphery of the stator and the inner periphery of the shell, the stator may be unstably supported.

SUMMARY

The present invention is made to solve the above-described problems, and an object of the present invention is to improve motor efficiency by suppressing leakage magnetic flux from a motor into a shell.

A motor according to the present invention is a motor disposed in a shell, and includes a stator having an outer peripheral surface facing an inner peripheral surface of the shell, a rotor rotatably disposed inside the stator, and a nonmagnetic film disposed between the outer peripheral surface of the stator and the inner peripheral surface of the shell.

According to the present invention, since the nonmagnetic film is disposed between the outer peripheral surface of the stator and the inner peripheral surface of the shell, leakage magnetic flux from the stator into the shell can be suppressed, and the motor efficiency can be improved. Further, since the shell does not need to be large, the motor can be downsized.

DETAILED DESCRIPTION

First Embodiment (Configuration of Motor)

Figure 1:
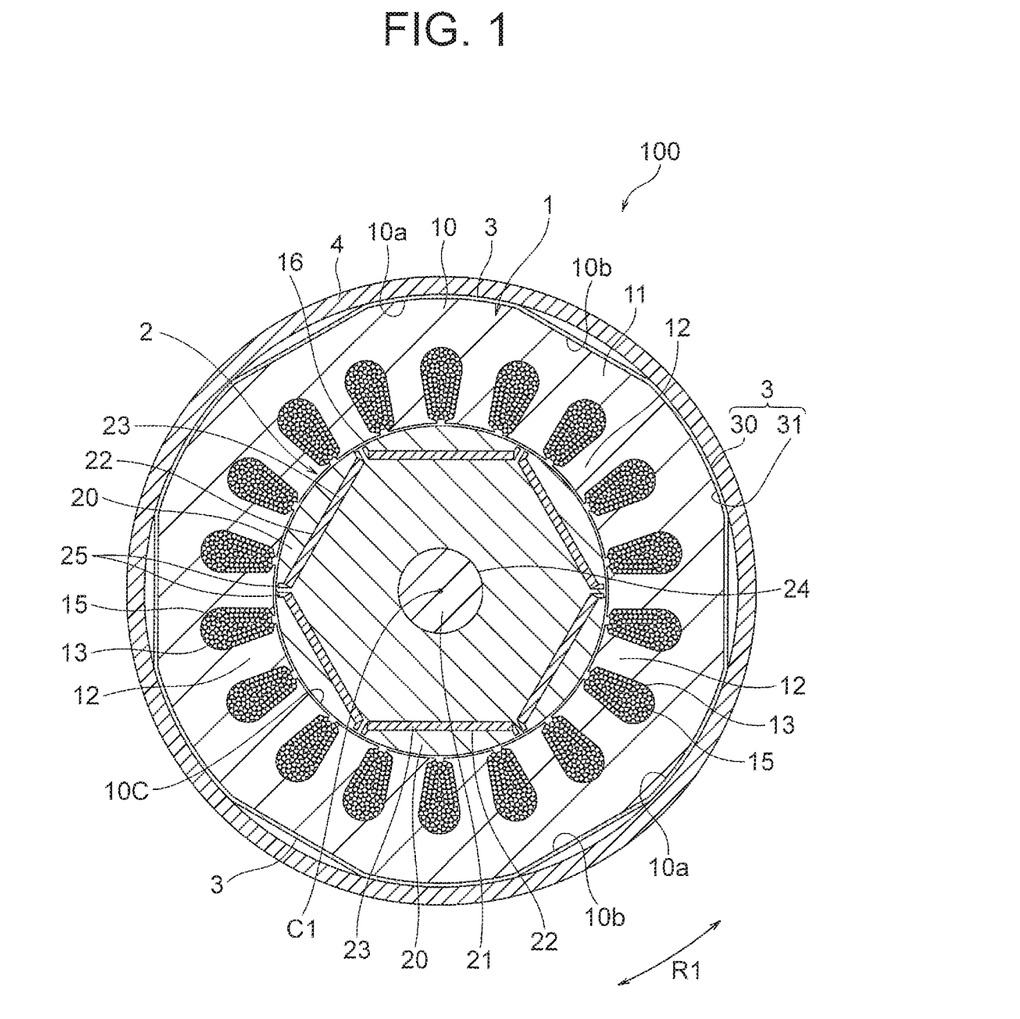
FIG. 1 is a sectional view illustrating a configuration of a motor according to a first embodiment.

FIG. 1 is a sectional view illustrating a motor 100 according to a first embodiment. The motor 100 illustrated in FIG. 1 is mounted inside a cylindrical shell (casing) 4. The shell 4 is a part of a container of a product (for example, a scroll compressor 500 illustrated in FIG. 10) in which the motor 100 is mounted.

The motor 100 includes a rotatable rotor 2, and a stator 1 provided so as to surround the rotor 2. The stator 1 is mounted inside the above-described shell 4. An air gap 16 of, for example, 0.5 mm is provided between the stator 1 and the rotor 2.

The rotor 2 includes a rotor core 20 having a plurality of magnet insertion holes 22, and permanent magnets 23 disposed in the respective magnet insertion holes 22. The rotor core 20 includes an outer peripheral surface having a cylindrical shape about an axis line C1 serving as a center of rotation. A shaft hole 24 is formed at a center of the rotor core 20 in a radial direction. A shaft 21 serving as a rotation shaft is fixed to the shaft hole 24 by press fitting.

Hereinafter, a direction of the axis line C1 serving as a rotation axis of the rotor 2 will be referred to as an "axial direction". Further, a direction along an outer periphery of the stator 1 or the rotor 2 (circumference about the axis line C1) will be referred to as a "circumferential direction". Further, a radial direction of the stator 1 or the rotor 2 about the axis line C1 will be referred to as a "radial direction".

The magnet insertion holes 22 penetrate the rotor core 20 in the axial direction. Further, a plurality of (in this case, six) magnet insertion holes 22 are formed at equal intervals in the circumferential direction of the rotor core 20. The magnet insertion holes 22 are grooves extending linearly in a plane perpendicular to the axial direction. The magnet insertion holes 22 are located as close to the outer peripheral surface of the rotor core 20 as possible.

The permanent magnets 23 are disposed in the magnet insertion holes 22. The permanent magnets 23 form magnetic poles of the rotor 2, and the number of the permanent magnets 23 in the circumferential direction is equal to the number of poles of the rotor 2. In other words, the rotor 2 has six poles in this example. However, the number of poles of the rotor 2 is not limited to 6, and it is sufficient that the number of poles of the rotor 2 is 2 or more.

The permanent magnet 23 can be composed of a rare-earth magnet containing neodymium (Nd), iron (Fe), and boron (B) as main ingredients and further containing dysprosium (Dy). Since the rare-earth sintered magnet has high residual magnetic flux density and high coercive force, efficiency and demagnetization resistance of the motor 100 can be improved. The permanent magnet 23 may also be composed of a ferrite sintered magnet containing iron oxide as a main ingredient. Since the ferrite sintered magnet has high coercive force and is stable in supply, manufacturing cost of the motor 100 can be reduced, and demagnetization resistance of the motor 100 can be improved.

Each permanent magnet 23 is magnetized to have different magnetic poles on outer and inner sides of the rotor core 20 in the radial direction. Further, the permanent magnets 23 adjacent to each other in the circumferential direction are magnetized in opposite directions. For example, when one of the permanent magnets 23 is magnetized to have a north pole on the outer side in the radial direction, its adjacent permanent magnet 23 in the circumferential direction is magnetized to have a south pole on the outer side in the radial direction.

Flux barriers 25 are formed at both ends of the magnet insertion hole 22 in the circumferential direction. Each flux barrier 25 is an air gap extending in the radial direction from the end of the magnet insertion hole 22 in the circumferential direction toward an outer periphery of the rotor core 20. The flux barriers 25 are provided for suppressing leakage magnetic flux between adjacent magnetic poles (that is, magnetic flux flowing through an inter-pole part).

The stator 1 includes a stator core 10, and a coil 15 wound around the stator core 10. The stator core 10 is made of, for example, electromagnetic steel sheets each having a thickness in a range of 0.1 to 0.7 mm stacked in the axial direction and fastened together by crimping or the like.

The stator core 10 includes an annular yoke part 11, and a plurality of (in this case, eighteen) teeth 12 projecting inward in the radial direction from the yoke part 11. The coil 15 is wound around the teeth 12 of the stator core 10 via an insulator (insulating part) which is not illustrated. A slot 13 for accommodating the coil 15 is formed between each pair of the teeth 12 adjacent to each other in the circumferential direction.

The coil 15 may be wound in distributed winding in which the coil 15 is wound across a plurality of teeth 12, or concentrated winding in which the coil 15 is wound around each tooth 12. With reference to FIG. 1, three slots 13 face one magnet insertion hole 22, but this embodiment is not limited to such an arrangement. Further, the number of the teeth 12 may be any number.

In this example, the outer peripheral surface of the stator core 10 includes six cylindrical surfaces 10a arranged at equal intervals in the circumferential direction, and six flat surfaces 10b each of which is located between adjacent two of the cylindrical surfaces 10a. The cylindrical surfaces 10a and the flat surfaces 10b are arranged in the circumferential direction so that their central angles about the axis line C1 are set to a fixed angle (for example, 30°). The cylindrical surfaces 10a serve as contact surfaces which are in contact with an inner peripheral surface of the shell 4. The flat surfaces 10b are not in contact with the inner peripheral surface of the shell 4, and gaps are formed between the flat surfaces 10b (non-contact surfaces) and the inner peripheral surface of the shell 4.

A nonmagnetic film 3 is provided between the outer peripheral surface of the stator core 10 and the inner peripheral surface of the shell 4. The nonmagnetic film 3 is formed to have an annular shape and disposed over an entire area of the outer peripheral surface of the stator core 10.

An outer peripheral surface 30 of the nonmagnetic film 3 is in contact with the inner peripheral surface of the shell 4, and an inner peripheral surface 31 of the nonmagnetic film 3 is in contact with the outer peripheral surface of the stator core 10. In this embodiment, the stator core 10 is fitted into the shell 4 by shrink fitting in a state where the nonmagnetic film 3 is fixed to the outer peripheral surface of the stator core 10.

The nonmagnetic film 3 has a function to suppress leakage magnetic flux from the stator core 10 into the shell 4. The nonmagnetic film 3 is formed of a resin and desirably has a relative dielectric constant in a range of 2 to 4. When the relative dielectric constant is in the range of 2 to 4, occurrence of eddy current in the nonmagnetic film 3 can be suppressed. Further, the stator core 10 is fitted into the shell by shrink fitting as described later, and therefore the nonmagnetic film 3 desirably has heat resistance.

More specifically, the nonmagnetic film 3 is formed of, for example, polyethylene terephthalate (PET) or polyethylene naphthalate (PEN). A melting point of PET of 258° C., but an available temperature of PET is −70° C. to 150° C., and therefore a shrink fitting temperature needs to be 150° C. or lower. PEN is superior to PET in heat resistance and strength, and therefore the shrink fitting temperature may be 150° C. or higher. Since both PET and PEN have flexibility, the nonmagnetic film 3 can be easily attached to the outer periphery of the stator core 10.

When the nonmagnetic film 3 is composed of PET, the nonmagnetic film 3 desirably has a thickness in a range of 75 μm to 300 μm. When the nonmagnetic film 3 is composed of PEN, the nonmagnetic film 3 desirably has a thickness in a range of 12 μm to 250 μm.

For example, when the nonmagnetic film 3 is composed of PET, the thickness T of the nonmagnetic film 3 desirably satisfies $0.15 \leq T/G \leq 0.6$ where G represents the gap (the air gap 16 illustrated in FIG. 1) between the stator 1 and the rotor 2. When the nonmagnetic film 3 is composed of PEN, the thickness T of the nonmagnetic film 3 desirably satisfies $0.024 \leq G \leq 0.5$.

Figure 2:
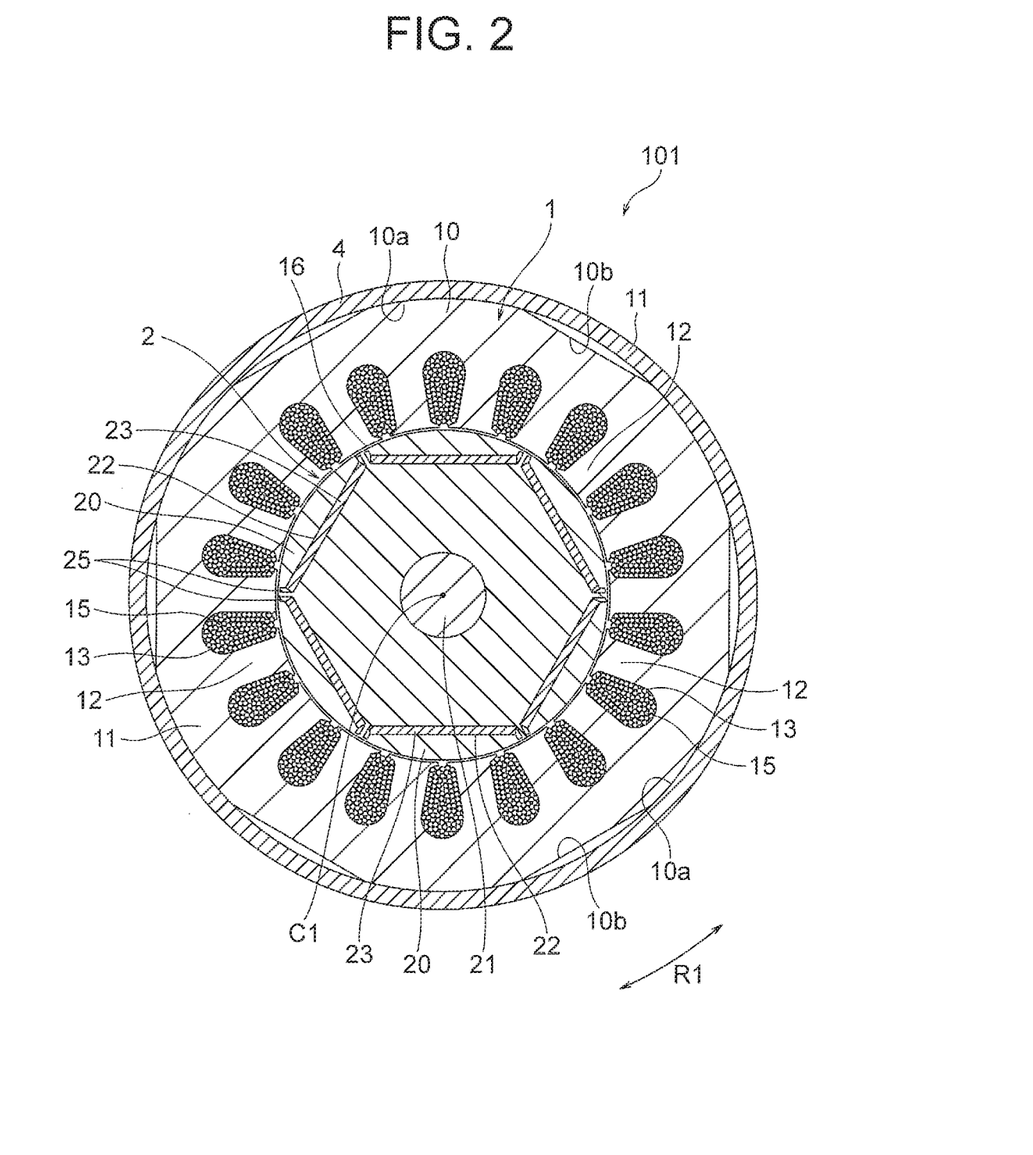
FIG. 2 is a sectional view illustrating the configuration of the motor according to a comparative example.

FIG. 2 is a sectional view illustrating a configuration of a motor 101 according to a comparative example. With reference FIG. 2, a description will be given using the same reference numerals as those in FIG. 1, for convenience of explanation. The motor 101 according to the comparative example includes the stator 1 and the rotor 2 which are similar to those of the motor 100 according to the first embodiment, but includes no nonmagnetic film between the stator core 10 and the shell 4. In other words, the cylindrical surfaces 10a of the outer peripheral surface of the stator core 10 are in contact with the inner peripheral surface of the shell 4.

(Function of Nonmagnetic Film)

Figure 3A:
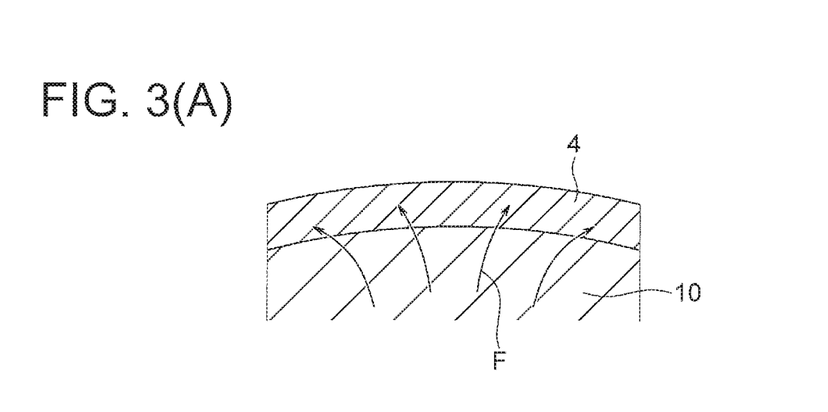
FIGS. 3(A) and 3(B) are diagrams illustrating a function of the motor according to the first embodiment by comparison with the comparative example.
Figure 3B:
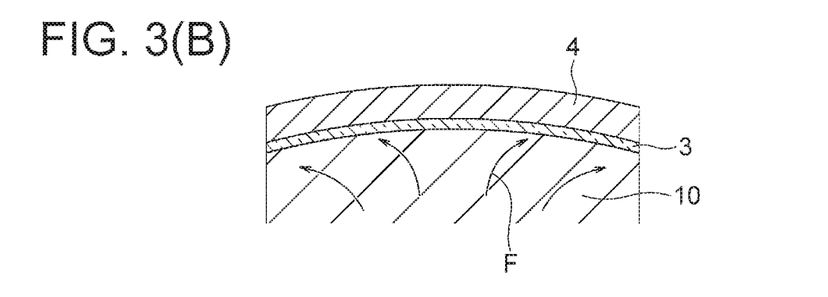

Next, a function of the nonmagnetic film 3 will be described. FIG. 3(A) is a diagram schematically illustrating flow of magnetic flux between the stator core 10 of the motor 101 (FIG. 2) and the shell 4 in the comparative example. FIG. 3(B) is a diagram schematically illustrating flow of magnetic flux between the stator core 10 of the motor 100 (FIG. 1) and the shell 4 in the first embodiment.

Magnetic flux from the permanent magnet 23 of the rotor 2 flows into each tooth 12 through an end part of the tooth 12 on an inner side in the radial direction, flows through the tooth 12 outward in the radial direction, flows into the yoke part 11, and interlinks with the coil 15. When the motor 100 is driven, driving force for rotating the rotor 2 about the axis line C1 is generated by action between the magnetic flux and current flowing through the coil 15.

In the motor 101 according to the comparative example, as illustrated in FIG. 3(A), the outer peripheral surface of the stator core 10 is in contact with the inner peripheral surface of the shell 4, and therefore a part of the magnetic flux flowing through the stator core 10 flows into the shell 4 as indicated by arrows F. Since the shell 4 is formed of an iron bulk body, a high iron loss occurs when the magnetic flux flows in the shell 4.

In contrast, in the motor 100 according to the first embodiment, as illustrated in FIG. 3(B), the nonmagnetic film 3 is disposed between the outer peripheral surface of the stator core 10 and the inner peripheral surface of the shell 4, and therefore the leakage magnetic flux flowing from the stator core 10 into the shell 4 can be suppressed. Since the leakage magnetic flux is suppressed in this way, the iron loss can be suppressed.

Figure 4:
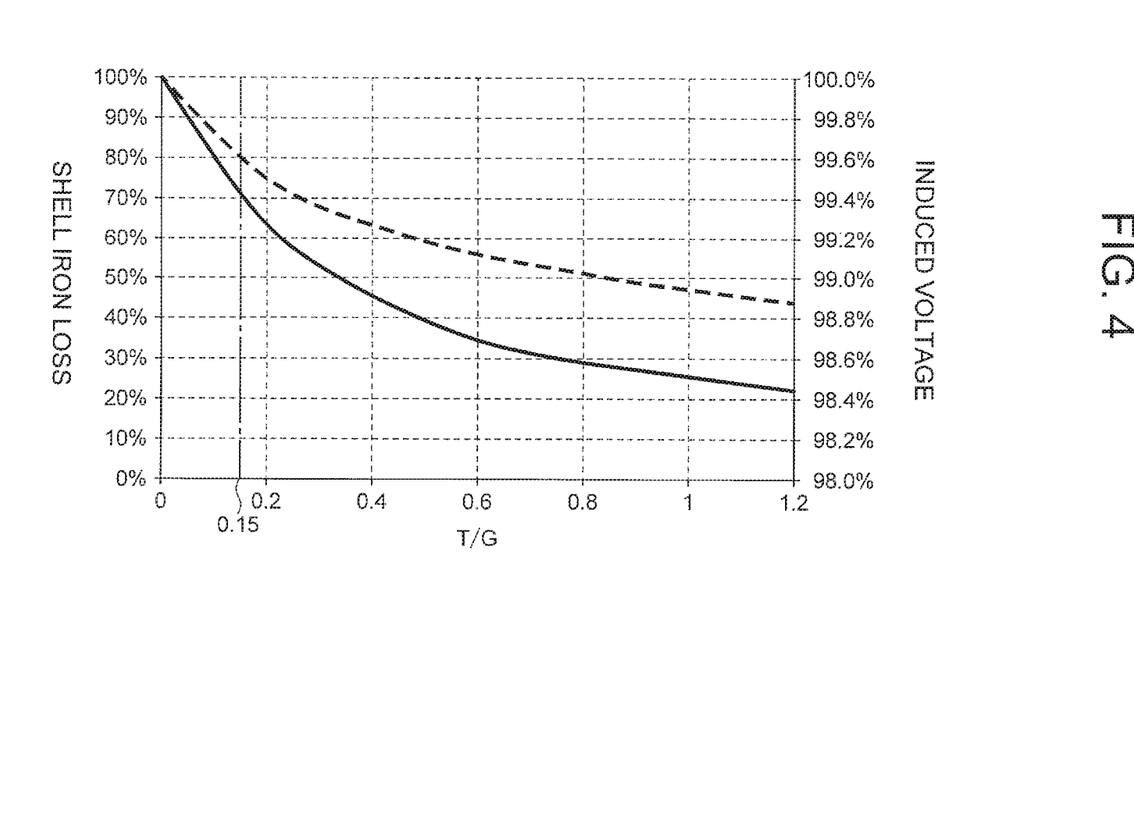
FIG. 4 is a characteristic diagram illustrating a relationship between a thickness of a nonmagnetic film and an iron loss and a relationship between the thickness of the nonmagnetic film and an induced voltage, in the first embodiment.

FIG. 4 is a graph illustrating changes in the iron loss and the induced voltage with respect to the thickness of the nonmagnetic film 3. Vertical axes of FIG. 4 represent the iron loss (left) and the induced voltage (right) in the shell 4 obtained by magnetic field analysis. A horizontal axis represents a value (T/G) obtained by dividing the thickness T (mm) of the nonmagnetic film 3 by the gap G (mm) between the stator 1 and the rotor 2. The iron loss means a loss cause by flow of magnetic flux in the shell 4. The induced voltage means a counter electromotive force caused by flow of magnetic flux in the teeth 12.

In this regard, the reason for evaluating the thickness T of the nonmagnetic film 3 using a value relative to the gap G is because the gap G is determined according to a size of the motor 100. In this case, the gap G is set to 0.5 mm (fixed value), and the thickness T of the nonmagnetic film 3 is changed. Further, characteristics of the iron loss and the induced voltage illustrated in FIG. 4 are the same in both cases where the nonmagnetic film 3 is composed of PET and where the nonmagnetic film 3 is composed of PEN.

As for the iron loss, the iron loss in the shell 4 in the motor 101 (FIG. 2) according to the comparative example having no nonmagnetic film 3 is regarded as 100%. As shown by a solid line in FIG. 4, when the nonmagnetic film 3 is provided between the stator core 10 and the shell 4, the iron loss decreases as the thickness T of the nonmagnetic film 3 increases.

For example, when T/G is 0.15, the iron loss is 80%, and improvement effect with respect to the comparative example (iron loss: 100%) is observed. Further, when T/G is 0.2, the iron loss is 65%, when T/G is 0.4, the iron loss is 45%, and when T/G is 0.6, the iron loss is 35%. In a range where T/G exceeds 0.6, a decreasing rate of the iron loss with respect to increase in T/G is gradual.

As for the induced voltage, the induced voltage in the motor 101 (FIG. 2) according to the comparative example having no nonmagnetic film 3 is regarded as 100%. As shown by a broken line in FIG. 4, when the nonmagnetic film 3 is provided between the stator core 10 and the shell 4, the induced voltage decreases as the thickness T of the nonmagnetic film 3 increases. The reason why the induced voltage decreases as the thickness T of the nonmagnetic film 3 increases is as follows.

That is, as the thickness T of the nonmagnetic film increases, magnetic flux is less likely to flow into the shell 4, and therefore magnetic flux flowing through the teeth 12 fully flows into the yoke part 11. In this case, when excess magnetic flux flows into the yoke part 11, magnetic saturation occurs in the yoke part 11, a magnetic permeability of the yoke part 11 decreases, and an amount of magnetic flux in the yoke part 11 decreases. As a result, an amount of magnetic flux flowing in the teeth 12 decreases, an amount of magnetic flux interlinking with the coil 15 decreases, and the induced voltage decreases.

As the thickness T of the nonmagnetic film 3 decreases, magnetic flux is more likely to flow into the shell 4. Therefore, even when the magnetic saturation occurs in the yoke part 11 and the magnetic permeability thereof decreases, the amount of magnetic flux flowing in the teeth 12 can be increased by an amount of magnetic flux flowing into the shell 4. Accordingly, the amount of magnetic flux interlinking with the coil 15 increases, and the induced voltage increases. For this reason, the induced voltage decreases as the thickness T of the nonmagnetic film 3 increases.

In FIG. 4, for example, when T/G is 0.15, the induced voltage is 99.6%, and when T/G is 0.2, the induced voltage is 99.5%. Further, when T/G is 0.4, the induced voltage is 99.3%, and when T/G is 0.6, the induced voltage is 99.1%. It is understood that, in a range of T/G (0.15 to 0.6) in which the above-described iron loss efficiently decreases, the induced voltage decreases, but a decreasing rate is low (less than 1%).

Figure 5:
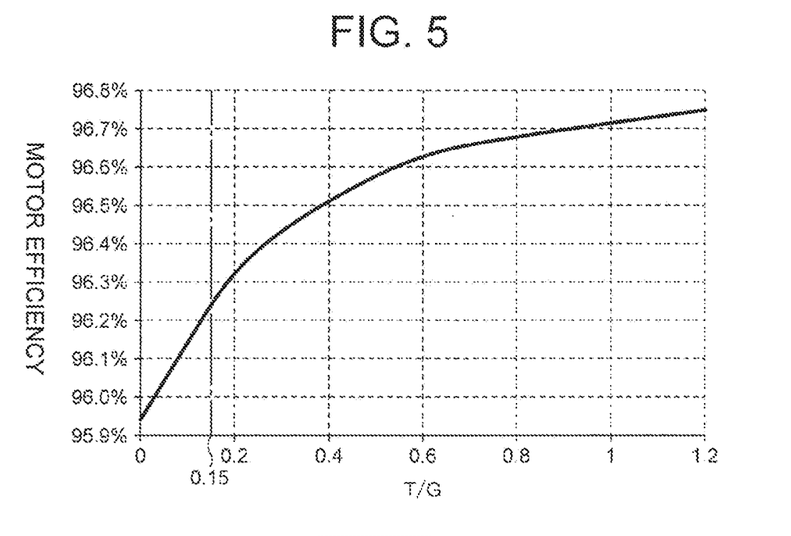
FIG. 5 is a characteristic diagram illustrating a relationship between the thickness of the nonmagnetic film and a motor efficiency in the first embodiment.

FIG. 5 is a graph illustrating a change in the motor efficiency with respect to the thickness of the nonmagnetic film 3. The vertical axis of FIG. 5 represents the motor efficiency calculated by the magnetic field analysis. The horizontal axis of FIG. 5 represents the value (T/G) obtained by dividing the thickness T of the nonmagnetic film 3 by the gap G. As for the motor efficiency, the motor efficiency when no iron loss is assumed to occur is regarded as 100%.

In FIG. 5, the motor efficiency is 95.9% in the motor 101 (FIG. 2) according to the comparative example having no nonmagnetic film 3. In contrast, when the nonmagnetic film 3 composed of PET is provided between the stator core 10 and the shell 4, and T/G is set to 0.15, the motor efficiency is 96.25%, and improvement effect with respect to the comparative example is observed. Further, when T/G is 0.2, the motor efficiency is 96.3%, when T/G is 0.4, the motor efficiency is 96.5%, and when T/G is 0.6, the motor efficiency is 96.63%. In a range where T/G exceeds 0.6, an increasing rate of the motor efficiency with respect to increase in T/G is gradual.

From these results, it is understood that the most desirable range of T/G in terms of suppressing the leakage magnetic flux is $0.15 \leq T/G \leq 0.6$. When, for example, the gap G is 0.5 mm, the range of the thickness of the nonmagnetic film 3 corresponding to the above-described most desirable range of T/G (0.15 to 0.6) is 75 μm to 300 μm.

When the nonmagnetic film 3 is composed of PET, the nonmagnetic film 3 can be manufactured without increasing manufacturing cost as long as its thickness is in a range of 75 μm to 300 μm. Therefore, the thickness of the nonmagnetic film 3 composed of PET is desirably in a range of 75 μm to 300 μm.

In contrast, when the nonmagnetic film 3 is composed of PEN, the nonmagnetic film 3 can be manufactured without increasing manufacturing cost as long as its thickness is in a range of 12 μm to 250 μm. Therefore, the thickness T of the nonmagnetic film 3 composed of PEN is desirably in a range of 12 μm to 250 μm. This corresponds to a range of 0.024≤T/G≤0.5 when the gap G is set to 0.5 mm. From FIGS. 4 and 5, it is understood that suppressing effect of the iron loss and improving effect of the motor efficiency are obtained to a certain extent when T/G is within this range (0.024 to 0.5).

(Process of Manufacturing Motor)

Figure 6:
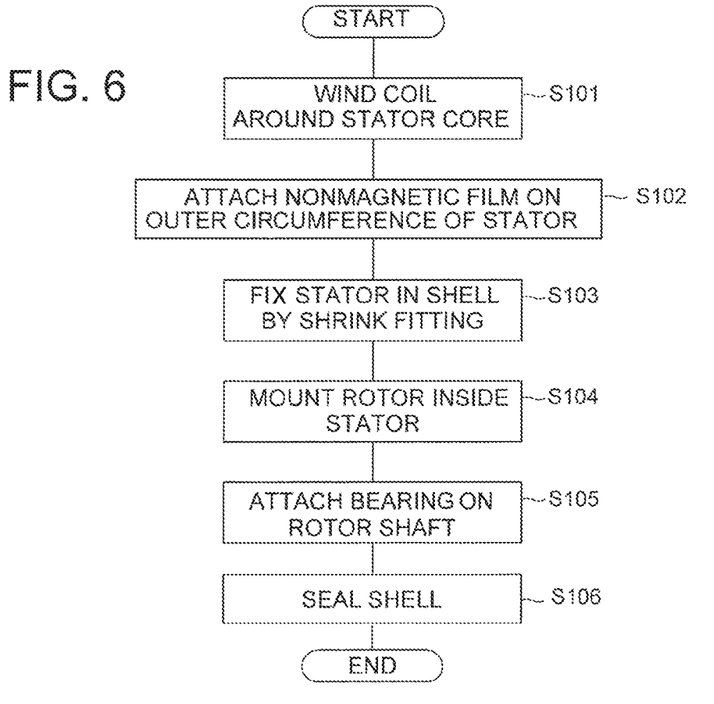
FIG. 6 is a flowchart illustrating a method for manufacturing the motor according to the first embodiment.

A process of manufacturing the motor 100 in this first embodiment will be described. FIG. 6 is a flowchart for explaining the process of manufacturing the motor 100 according to the first embodiment. First, the stator core 10 is prepared, the insulator which is not illustrated is attached to (or molded integrally with) the teeth 12, and the coil 15 is wound around the teeth 12 using a winding apparatus (step S101).

Figure 7:
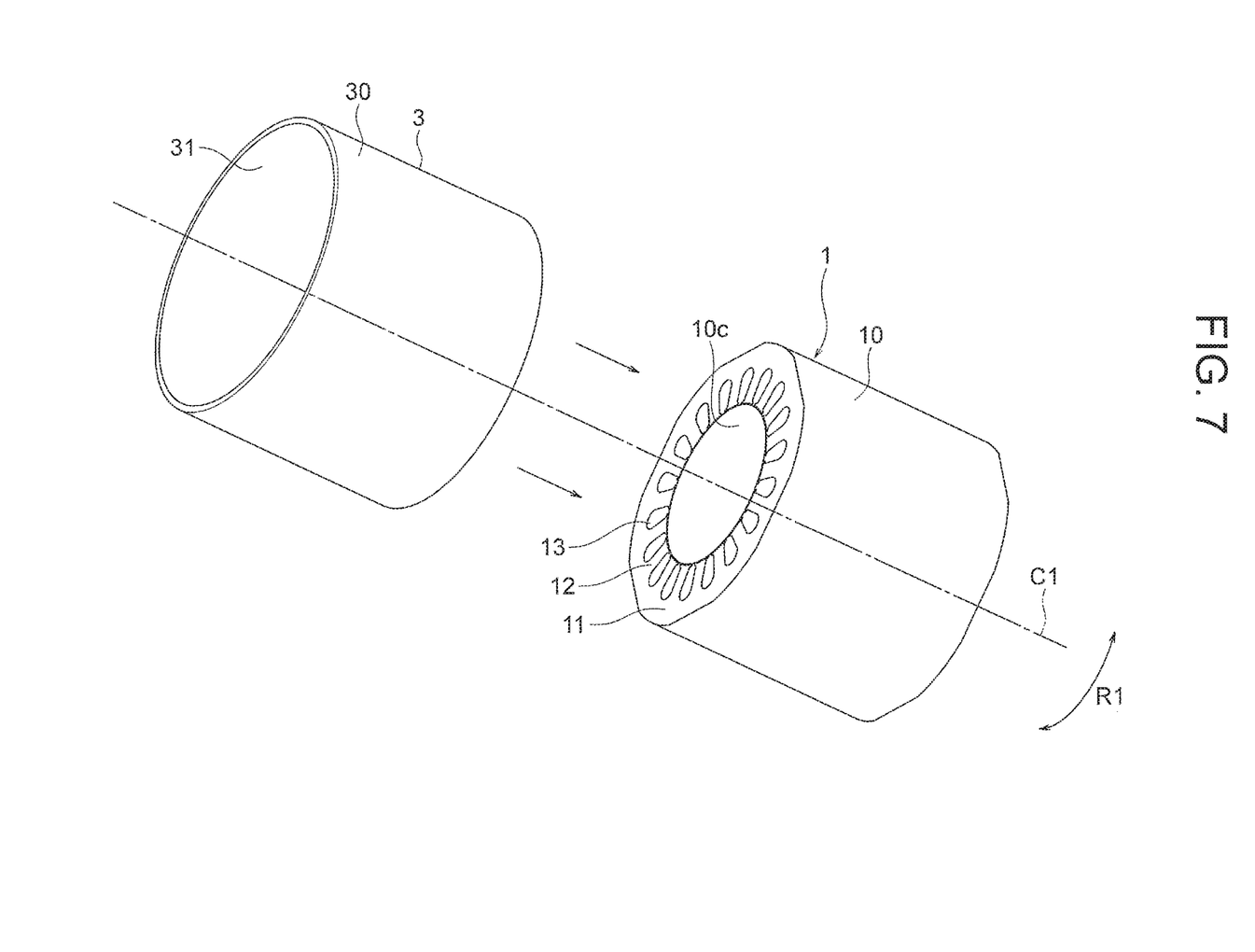
FIG. 7 is a schematic view for explaining a method for attaching the nonmagnetic film according to the first embodiment.

Then, the nonmagnetic film 3 is attached to the outer peripheral surface of the stator core 10 (step S102). FIG. 7 is a schematic view for explaining a process of attaching the nonmagnetic film 3 to the stator core 10. The nonmagnetic film 3 is formed as a flexible tube. Therefore, the nonmagnetic film 3 can be mounted to cover the outer peripheral surface of the stator core 10 in such a manner that the nonmagnetic film 3 is elastically deformed and stretched in the radial direction.

The nonmagnetic film 3 is fixed to the outer peripheral surface of the stator core 10 in such a manner that the nonmagnetic film 3 is in close contact with the outer peripheral surface of the stator core 10 by an elastic force of the nonmagnetic film 3. Alternatively, the nonmagnetic film 3 may be fixed to the stator core 10 by bonding using an adhesive agent coated on the outer peripheral surface of the stator core 10 in advance.

Then, the stator core 10 to which the nonmagnetic film 3 is fixed is fitted by shrink fitting into the shell 4 of, for example, a compressor (step S103). More specifically, in a state where the shell 4 is heated and thermally expanded, the stator core 10 is inserted into the shell 4. Then, the heating of the shell 4 is stopped, and the shell 4 is caused to shrink. Accordingly, the nonmagnetic film 3 is sandwiched between the outer peripheral surface of the stator core 10 and the inner peripheral surface of the shell 4.

As described above, in the case where the nonmagnetic film 3 is composed of PET, the shrink fitting temperature needs to be set to 150° C. or lower. In the case where the nonmagnetic film 3 is composed of PEN, the shrink fitting temperature can be set to 150° C. or higher.

The rotor 2 is assembled by fitting the shaft 21 into the shaft hole 24 of the rotor core 20 and inserting the permanent magnets 23 into the magnet insertion holes 22. The rotor 2 is inserted inside the stator core 10 fitted in the shell 4 (step S104). Then, bearings and a compression mechanism are mounted on the shaft 21 of the rotor 2 (step S105). A lid or the like is attached to the shell 4 to seal an interior of the shell 4 (step S106). Accordingly, the motor 100 mounted in the shell 4 is manufactured.

According to this manufacturing method, since the stator core 10 is fitted into the shell 4 after the stator core 10 is covered with the nonmagnetic film 3 having a tubular shape, the nonmagnetic film 3 can be disposed between the stator core 10 and the shell 4 by a simple method.

In the foregoing description, the rotor 2 is mounted inside the stator 1 (step S104) after the stator 1 is fitted into the shell 4 (step S103), but the stator 1 may be fitted into the shell 4 after the rotor 2 is inserted into the stator 1. Further, in the case where outer diameters of the bearings are smaller than an outer diameter of the rotor 2, the rotor 2 may be inserted inside the stator 1 after the bearings are mounted on the shaft 21 of the rotor 2 in advance.

Effects of Embodiment

As described above, in the first embodiment of the present invention, since the nonmagnetic film 3 is disposed between the outer peripheral surface of the stator 1 and the inner peripheral surface of the shell 4, the leakage magnetic flux from the stator 1 into the shell 4 can be suppressed, and the motor efficiency can be improved. Further, the shell 4 does not need to be made larger, and the motor 100 can be downsized.

Further, since the nonmagnetic film 3 has a tubular shape and has flexibility, the nonmagnetic film 3 can be attached to the stator so as to cover the outer periphery of the stator 1. Therefore, the process of manufacturing the motor 100 is simplified, and the manufacturing cost can be reduced.

Further, since the nonmagnetic film 3 is provided over an entire area of the outer periphery of the stator 1, the leakage magnetic flux from the stator 1 into the shell 4 can be effectively suppressed.

Further, since the nonmagnetic film 3 is composed of PET or PEN, the leakage magnetic flux is suppressed, and sufficient durability is obtained against heat applied when the stator core 10 is fitted into the shell 4 by shrink fitting.

Further, in the case where the nonmagnetic film 3 is composed of PET and has a thickness in a range of 75 μm to 300 μm (0.15≤T/G≤0.6), the leakage magnetic flux can be effectively suppressed without increasing the manufacturing cost.

Further, in the case where the nonmagnetic film 3 is composed of PEN and has a thickness in a range of 12 μm to 250 μm (0.024≤T/G≤0.5), the leakage magnetic flux can be suppressed without increasing the manufacturing cost.

Further, in the process of manufacturing the motor 100, the nonmagnetic film 3 is attached to the outer side of the stator 1 and the stator 1 is fitted into the shell 4 by shrink fitting, and therefore the nonmagnetic film 3 can be disposed between the outer peripheral surface of the stator 1 and the inner peripheral surface of the shell 4 by a simple method.

Second Embodiment

Figure 8:
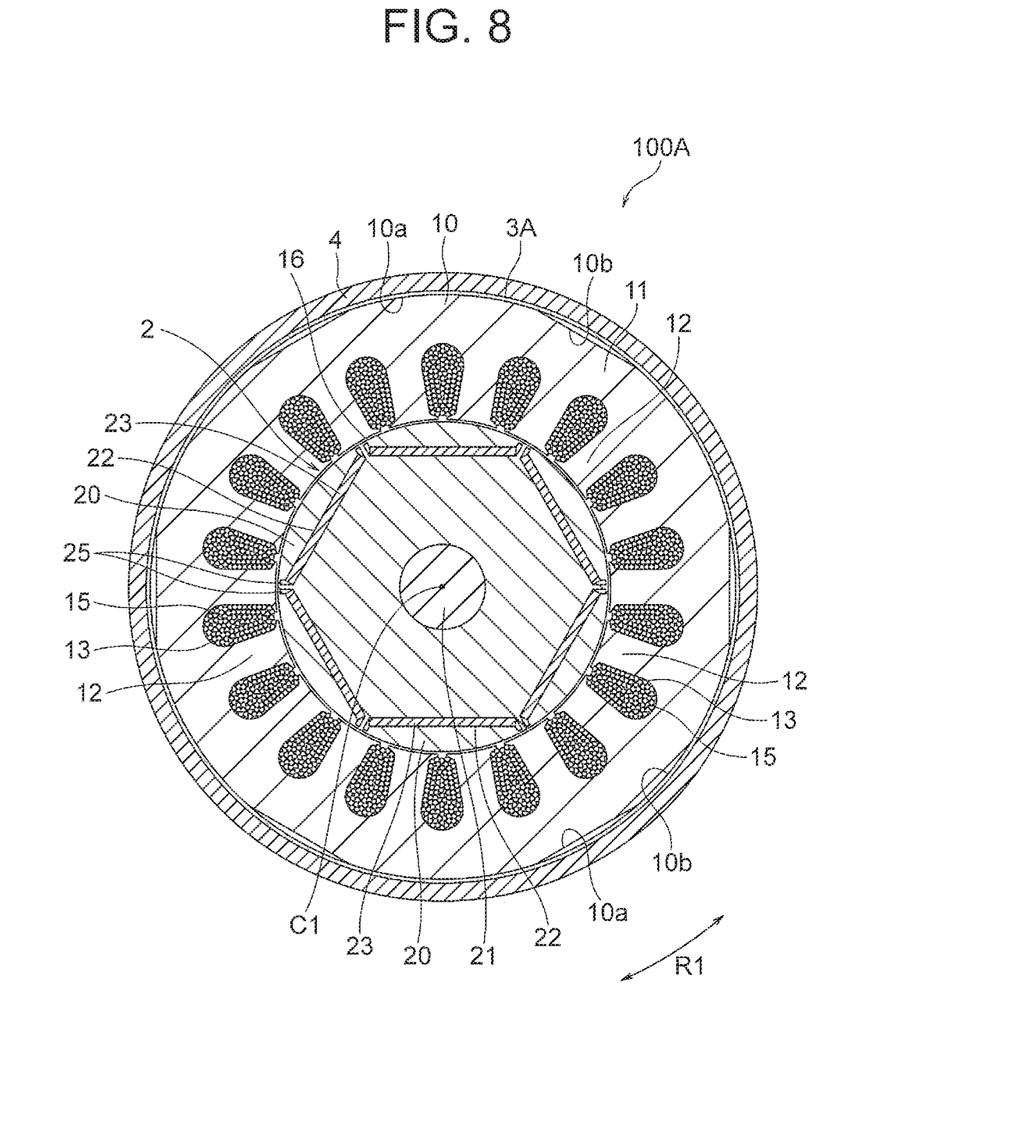
FIG. 8 is a sectional view illustrating a configuration of a motor according to a second embodiment.

Next, a second embodiment of the present invention will be described. FIG. 8 is a sectional view illustrating a configuration of a motor 100A according to the second embodiment. In the above-described first embodiment, the nonmagnetic film 3 is fixed to the outer peripheral surface of the stator 1 before the stator 1 is fitted into the shell 4. In contrast, in this second embodiment, a nonmagnetic film 3A is fixed to the inner peripheral surface of the shell 4.

The nonmagnetic film 3A is fixed to the inner peripheral surface of the shell 4 by, for example, bonding. By fitting the stator 1 into the shell 4 by shrink fitting, a configuration in which the nonmagnetic film 3A is disposed between the outer peripheral surface of the stator 1 and the inner peripheral surface of the shell 4 is obtained. The material and the thickness of the nonmagnetic film 3A in the second embodiment are the same as those of the nonmagnetic film 3 in the first embodiment.

The nonmagnetic film 3A is fixed to the inner peripheral surface of the shell 4 in advance, and therefore a gap is formed between the nonmagnetic film 3A and the flat surface 10b of the outer peripheral surface of the stator 1. Further, the shell 4 is heated in the shrink fitting process, and therefore the nonmagnetic film 3A in the second embodiment is heated to a temperature higher than the nonmagnetic film 3 of the first embodiment.

In the motor 100A according to this second embodiment, since the nonmagnetic film 3A is disposed between the outer peripheral surface of the stator 1 and the inner peripheral surface of the shell 4, the leakage magnetic flux from the stator 1 into the shell 4 can be suppressed, and the motor efficiency can be improved. Other components of the motor 100A according to the second embodiment are the same as those of the motor 100 according to the first embodiment.

Further, a method for manufacturing the motor 100A according to the second embodiment is the same as the method for manufacturing the motor 100 according to the first embodiment, except that the nonmagnetic film 3A is not fixed to the outer peripheral surface of the stator 1 but fixed to the inner peripheral surface of the shell 4.

As described above, in the second embodiment of the present invention, the nonmagnetic film 3A is disposed between the outer peripheral surface of the stator 1 and the inner peripheral surface of the shell 4, and therefore the leakage magnetic flux from the stator 1 into the shell 4 can be suppressed and the motor efficiency can be improved, similarly to the first embodiment.

Embodiment 3

Figure 9:
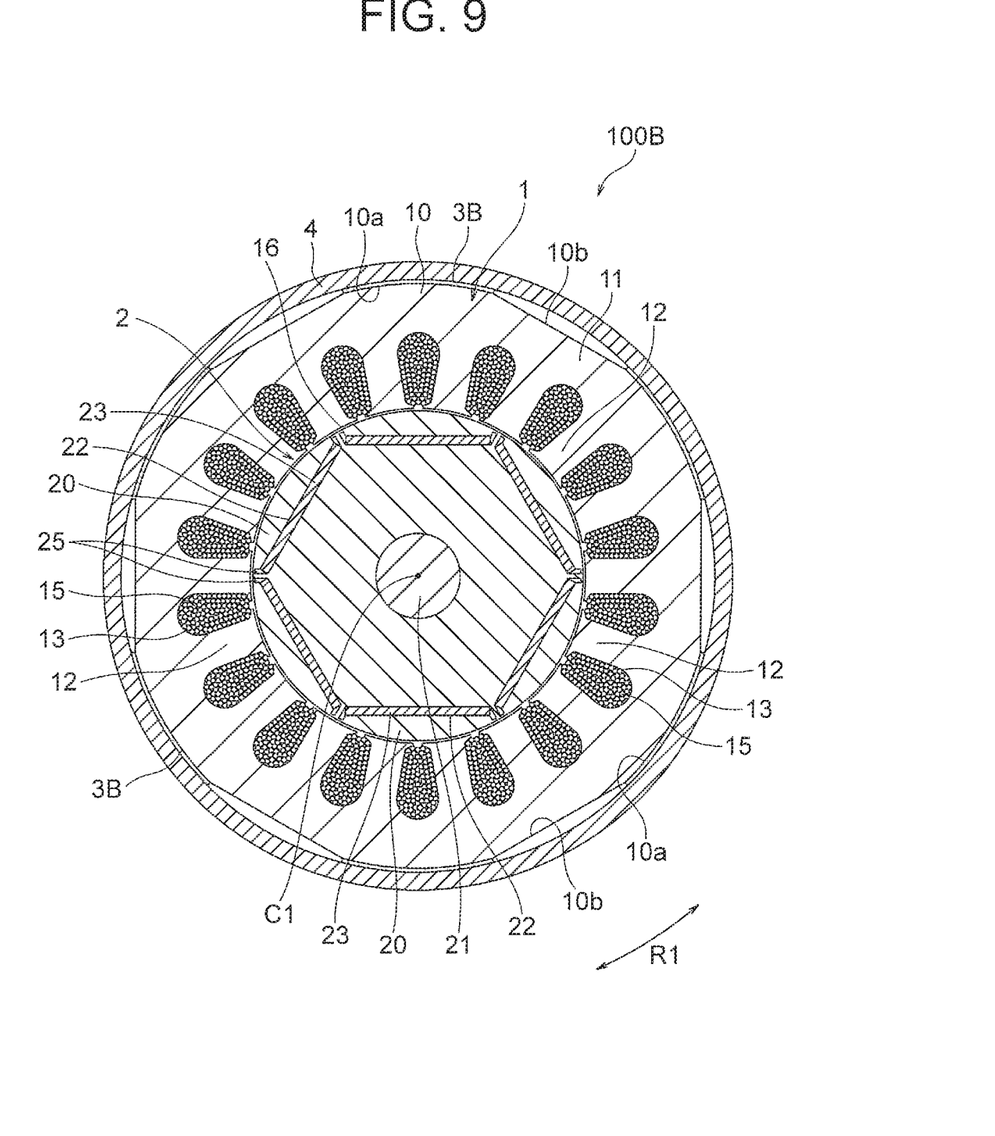
FIG. 9 is a sectional view illustrating a configuration of a motor according to a third embodiment.

Next, a third embodiment of the present invention will be described. FIG. 9 is a sectional view illustrating a configuration of a motor 100B according to the third embodiment. In the above-described first embodiment, the nonmagnetic film 3 is fixed to the entire area of the outer peripheral surface of the stator 1. In contrast, in this third embodiment, nonmagnetic films 3B are fixed only to cylindrical surfaces 10a which are parts of the outer peripheral surface of the stator 1.

The cylindrical surfaces 10a and the flat surfaces 10b are alternately formed on the outer peripheral surface of the stator core 10, as described in the first embodiment. The cylindrical surfaces 10a are in contact with the inner peripheral surface of the shell 4, and gaps are formed between the flat surfaces 10b and the inner peripheral surface of the shell 4. In this third embodiment, the nonmagnetic films 3B are disposed only on the cylindrical surfaces 10a. The material and the thickness of the nonmagnetic film 3B in the third embodiment are the same as those of the nonmagnetic film 3 in the first embodiment.

The nonmagnetic film 3 in the above-described first embodiment has a tubular shape (FIG. 7), but the nonmagnetic film 3B in this third embodiment is formed to have, for example, a band shape elongated in a direction parallel to the axis line C1. Further, the nonmagnetic films 3B are fixed to the cylindrical surfaces 10a of the outer peripheral surface of the stator 1 by, for example, bonding. Alternatively, the nonmagnetic films 3B may be fixed to the inner peripheral surface of the shell 4 by, for example, bonding.

In the motor 100B according to this third embodiment, since the nonmagnetic films 3B are disposed between the outer peripheral surface (cylindrical surfaces 10a) of the stator 1 and the inner peripheral surface of the shell 4, the leakage magnetic flux from the stator 1 into the shell 4 can be suppressed and the motor efficiency can be improved. Further, since the nonmagnetic films 3B are formed only on parts of the outer peripheral surface of the stator 1, less amount of material is needed for forming the nonmagnetic films 3B. Other components of the motor 100B according to the third embodiment are the same as those of the motor 100 according to the first embodiment.

Further, a method for manufacturing the motor 100B according to the third embodiment is the same as the method for manufacturing the motor 100 according to the first embodiment, except that the band-shaped nonmagnetic films 3B are fixed to the cylindrical surfaces 10a of the stator 1 (or the inner peripheral surface of the shell 4).

As described above, in the third embodiment of the present invention, since the nonmagnetic films 3B are disposed between parts (cylindrical surfaces 10a) of the outer peripheral surface of the stator 1 and the inner peripheral surface of the shell 4, the leakage magnetic flux from the stator 1 into the shell 4 can be suppressed and the motor efficiency can be improved, similarly to the first embodiment. In addition, less amount of material is needed for forming the nonmagnetic films 3B.

(Scroll Compressor)

Figure 10:
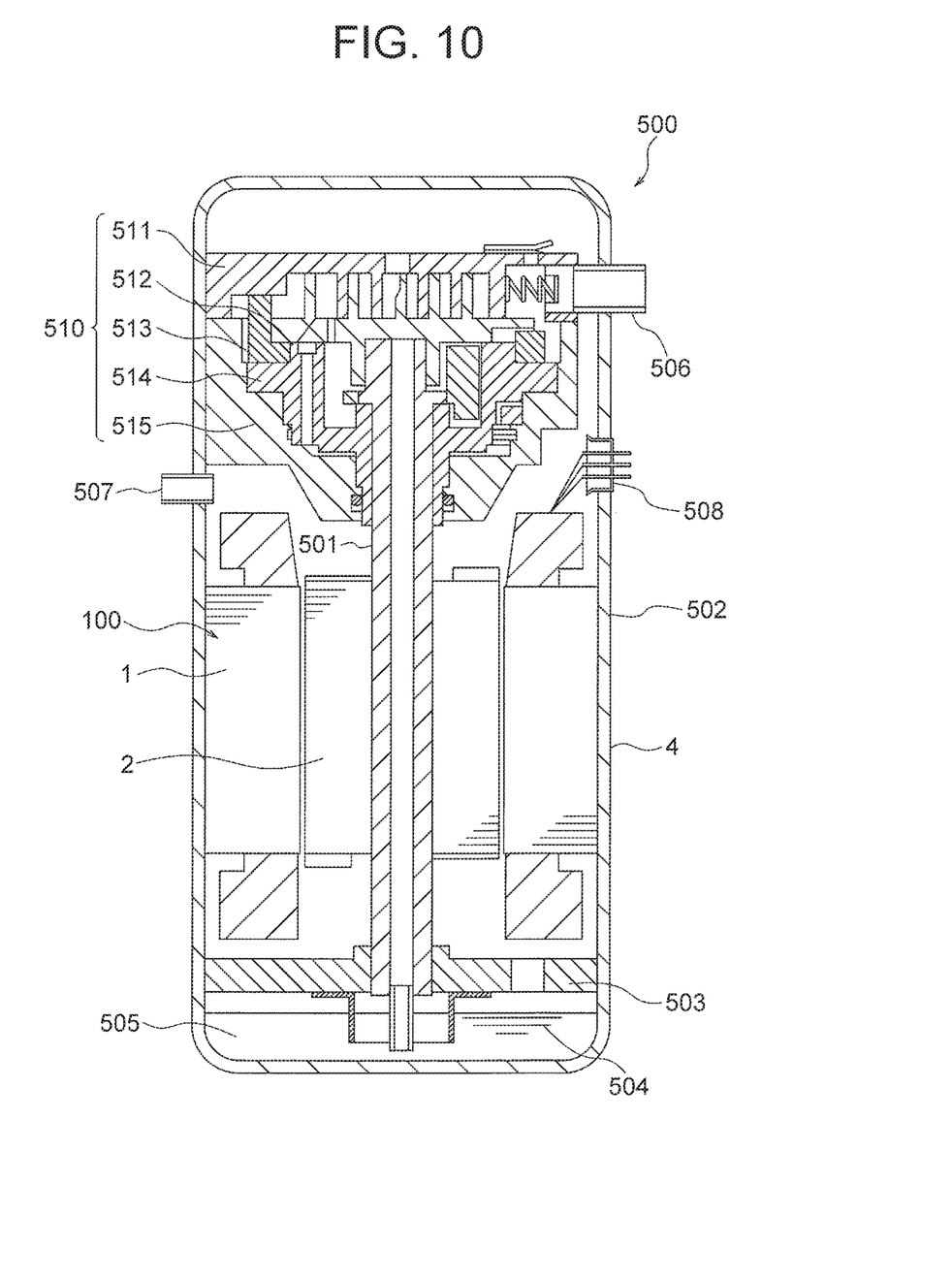
FIG. 10 is a diagram illustrating a compressor to which the motor in each of the embodiments is applied.

Next, a scroll compressor to which the motor according to each of the above-described embodiments is applied will be described. FIG. 10 is a sectional view illustrating a configuration of a scroll compressor 500 including the motor 100 according to the first embodiment. In this regard, the motor 100A or 100B according to the second or third embodiment 2 or 3 may be used in place of the motor 100 according to the first embodiment.

The scroll compressor 500 includes, in a closed container 502, a compression mechanism 510, the motor 100 driving the compression mechanism 510, a main shaft 501 connecting the compression mechanism 510 and the motor 100, a sub-frame 503 supporting an end (sub-shaft part) of the main shaft 501 opposite to the compression mechanism 510, and refrigerating machine oil 504 stored in an oil sump 505 at a bottom part of the closed container 502.

The compression mechanism 510 includes a fixed scroll 511 and a swing scroll 512 combined together to form a compression chamber between their plate-like scroll teeth, an Oldham ring 513, a compliant frame 514, and a guide frame 515.

A suction pipe 506 penetrating the closed container 502 is press-fitted into the fixed scroll 511. Also provided is a discharge pipe 507 penetrating the closed container 502 for discharging high-pressure refrigerant gas discharged from a discharge port of the fixed scroll 511 to outside (refrigeration cycle).

The closed container 502 includes the cylindrical shell 4 into which the motor 100 is fitted by shrink fitting. Further, a glass terminal 508 for electrically connecting the stator 1 of the motor 100 and a driving circuit to each other is fixed to the closed container 502 by welding.

In the motor 100 (100A, 100B) according to each of the above-described embodiments 1 to 3, the motor efficiency is improved by reducing the leakage magnetic flux. Therefore, by using the motor 100 as a power source for the scroll compressor 500, an operation efficiency of the scroll compressor 500 can be improved and energy consumption can be reduced.

Although the scroll compressor 500 is described as an example of the compressor herein, the motor in each of the above-described embodiments may also be applied to compressors other than the scroll compressor 500.

(Refrigerating and Air Conditioning Apparatus)

Figure 11:
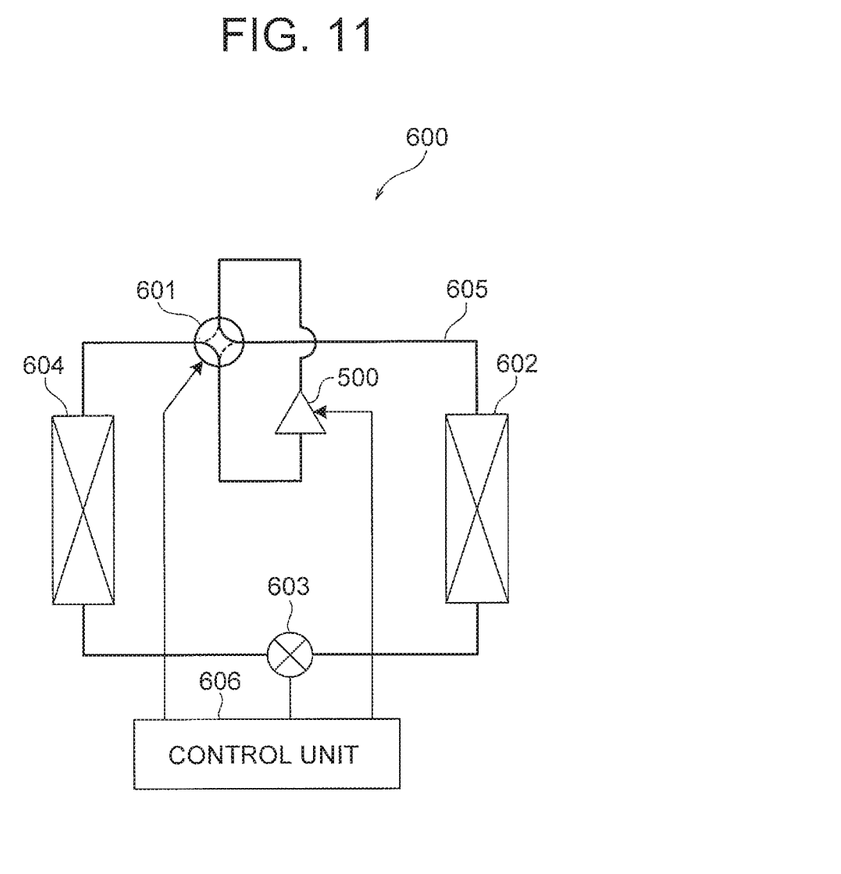
FIG. 11 is a diagram illustrating a refrigerating and air conditioning apparatus using the compressor illustrated in FIG. 10.

Next, a refrigerating and air conditioning apparatus 600 including the above-described scroll compressor 500 will be described. FIG. 11 is a diagram illustrating a configuration of the refrigerating and air conditioning apparatus 600. The refrigerating and air conditioning apparatus 600 illustrated in FIG. 11 includes the compressor (scroll compressor) 500, a four-way valve 601, a condenser 602, a decompressor (expander) 603, an evaporator 604, a refrigerant pipe 605, and a control unit 606. The compressor 500, the condenser 602, the decompressor 603, and the evaporator 604 are connected to each other via the refrigerant pipe 605 to form a refrigeration cycle.

The compressor 500 sucks refrigerant, compresses the refrigerant, and sends out the refrigerant as high-temperature and high-pressure gas refrigerant. The four-way valve 601 is configured to switch a flow direction of the refrigerant, and distributes the refrigerant sent out from the compressor 500 to the condenser 602 in a state illustrated in FIG. 11. The condenser 602 exchanges heat between the refrigerant flowing in from the compressor 500 through the four-way valve 601 and air (for example, outdoor air), condenses and liquefies the refrigerant, and sends out the refrigerant. The decompressor 603 expands the liquid refrigerant sent out from the condenser 602 and sends out the refrigerant as low-temperature and low-pressure liquid refrigerant.

The evaporator 604 exchanges heat between the low-temperature and low-pressure liquid refrigerant sent out from the decompressor 603 and air (for example, indoor air), evaporates (gasifies) the refrigerant by making the refrigerant take away heat from the air, and sends out the refrigerant as gas refrigerant. The air deprived of heat in the evaporator 604 is supplied to a target space (for example, an indoor space) by a fan which is not illustrated. Operations of the four-way valve 601 and the compressor 500 are controlled by the control unit 606.

Since the compressor 500 of the refrigerating and air conditioning apparatus 600 uses the motor having high efficiency as described in each of the embodiments, operation efficiency of the refrigerating and air conditioning apparatus 600 can be improved, and energy consumption can be reduced.

The components other than the compressor 500 in the refrigerating and air conditioning apparatus 600 are not limited to the above-described examples.

(Air Conditioning Apparatus)

Figure 12:
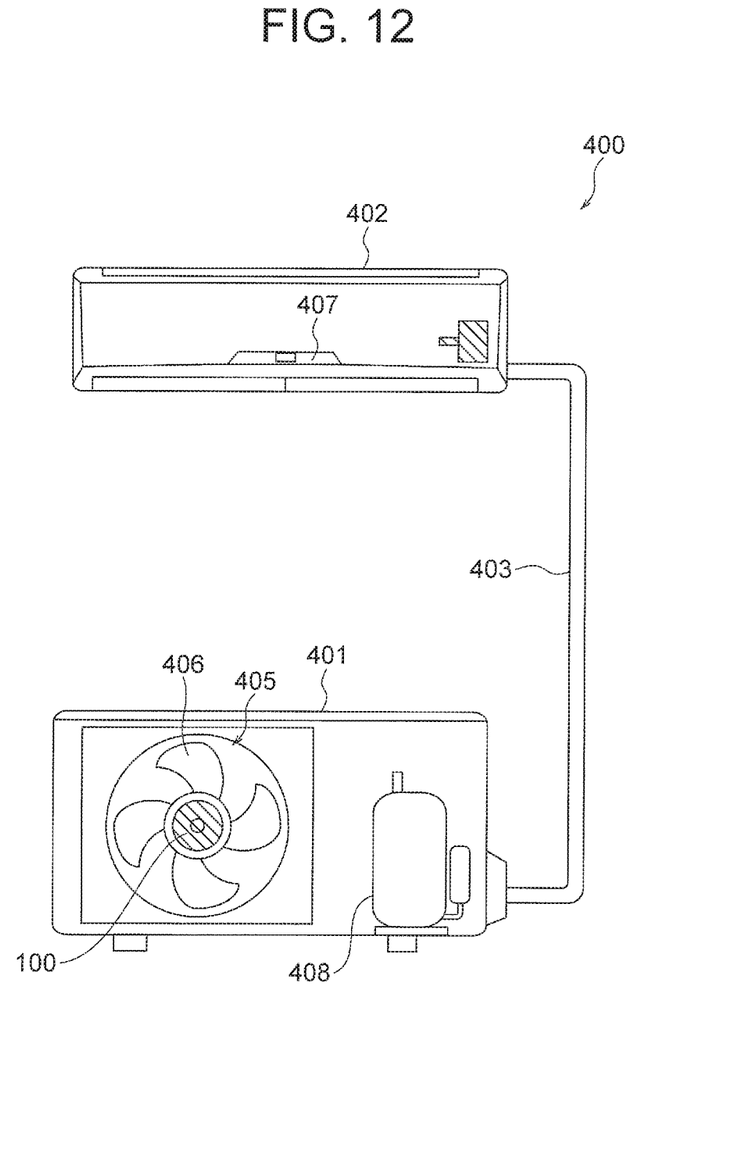
FIG. 12 is a diagram illustrating an air conditioning apparatus including a fan to which the motor in each of the embodiments is applied.

Next, an air conditioning apparatus to which the motor according to each of the above-described embodiments is applied will be described. FIG. 12 is a diagram illustrating a configuration of an air conditioning apparatus 400 using the motor 100 according to the first embodiment. In this regard, the motor 100A or 100B according to the second or third embodiment may be used in place of the motor 100 according to the first embodiment. The air conditioning apparatus 400 includes an outdoor unit 401, an indoor unit 402, and a refrigerant pipe 403 connecting these units to each other.

The outdoor unit 401 includes an outdoor fan 405 as a fan. The indoor unit 402 includes an indoor fan 407. FIG. 12 also illustrates a compressor 408 which compresses refrigerant in the outdoor unit 401.

The outdoor fan 405 of the outdoor unit 401 includes the motor 100 to which the motor described in each of the embodiments is applied. An impeller 406 is attached to the shaft 21 (FIG. 1) of the motor 100. When the rotor 2 (FIG. 1) of the motor 100 rotates, the impeller 406 attached to the shaft 21 rotates and blows air outdoors.

When the air conditioning apparatus 400 performs cooling operation, the refrigerant compressed by the compressor 408 is condensed in a condenser (not illustrated), and heat dissipated at the time of condensation is released outdoors by the air blown by the outdoor fan 405.

In the motor according to each of the above-described embodiments, the motor efficiency is improved by reducing the leakage magnetic flux. Thus, by using the motor 100 as a power source for the outdoor fan 405, operation efficiency of the air conditioning apparatus 400 can be improved and energy consumption can be reduced.

Although the motor described in each of the embodiments is applied herein to the motor 100 for the outdoor fan 405 of the outdoor unit 401, the motor 100 in each of the embodiments may also be applied to the indoor fan 407 of the indoor unit 402.

While desirable embodiments of the present invention have been described in detail above, the present invention is not limited thereto, and various improvements or modifications may be made without departing from the gist of the present invention.

What is claimed is:

1. A motor disposed in a shell, the motor comprising:
   a stator having an outer peripheral surface facing an inner peripheral surface of the shell;
   a rotor rotatably disposed inside the stator; and
   a nonmagnetic film disposed between the outer peripheral surface of the stator and the inner peripheral surface of the shell,
   wherein the nonmagnetic film is disposed over an entire area of the outer peripheral surface of the stator,
   wherein the nonmagnetic film is composed of polyethylene terephthalate, and
   wherein a gap G between the stator and the rotor and a thickness T of the nonmagnetic film satisfy:

$0.15 \leq T/G \leq 0.6$.

2. The motor according to claim 1,
   wherein the stator is fitted into the shell by shrink fitting; and
   wherein the nonmagnetic film is sandwiched between the outer peripheral surface of the stator and the inner peripheral surface of the shell.

3. The motor according to claim 1, wherein the nonmagnetic film is composed of a resin.

4. The motor according to claim 1, wherein the nonmagnetic film has a thickness in a range of 75 μm to 300 μm.

5. The motor according to claim 1, wherein the nonmagnetic film is fixed to the outer peripheral surface of the stator.

6. The motor according to claim 1, wherein the nonmagnetic film is fixed to the inner peripheral surface of the shell.

7. A compressor comprising a closed container having a shell, a compression mechanism disposed in the closed container, and the motor according to claim 1 driving the compression mechanism.

8. A refrigerating and air conditioning apparatus comprising a compressor, a condenser, a decompressor, and an evaporator, the compressor comprising a closed container having a shell, a compression mechanism disposed in the closed container, and the motor according to claim 1 driving the compression mechanism.

9. A motor disposed in a shell, the motor comprising:
a stator having an outer peripheral surface facing an inner peripheral surface of the shell;
a rotor rotatably disposed inside the stator; and
a nonmagnetic film disposed between the outer peripheral surface of the stator and the inner peripheral surface of the shell,
wherein the nonmagnetic film is disposed over an entire area of the outer peripheral surface of the stator,
wherein the nonmagnetic film is composed of polyethylene naphthalate, and
wherein a gap G between the stator and the rotor and a thickness T of the nonmagnetic film satisfy:

$0.024 \leq T/G \leq 0.5$.

10. The motor according to claim 9, wherein the nonmagnetic film has a thickness in a range of 12 μm to 250 μm.

* * * * *